Patented Feb. 6, 1940

2,189,379

UNITED STATES PATENT OFFICE 2,189,379

PROCESS FOR TREATING SODA ASPHALT

Samuel Kôn and Michel Tournadre, Petit-Couronne, France, assignors to Shell Development Company, San Francisco, Calif., a corporation of Delaware No Drawing. Application January 22, 1936, Serial No. 60,352. In France January 28, 1935

4 Claims. (Cl. 106—31)

This invention deals with a process of treating soda asphalt containing substantial amounts of organic sodium salts and/or free caustic soda whereby the substantially useless soda asphalt is converted to an asphalt which can be used for paving, roofing, waterproofing, and the like.

It is not uncommon practice to distil highly corrosive oils such as crude oils or oil fractions containing high amounts of naphthenic acids and/or sulphur, lubricating distillates and/or gas oil distillates from naphthenic crudes, etc., in the presence of caustic soda, either for the purpose of reducing corrosion, or to improve the distillate in some manner. From this type of distillation a residue, which we call soda asphalt, is obtained, which residue normally contains in excess of 20% by weight and even up to about 50% or more of organic, water-soluble sodium salts of the type of naphthenic acid soaps, and free caustic soda. For instance, in the redistillation of a Venezuelan straight run viscous distillate over concentrated caustic, a residue comprising asphalt, cylinder oil and naphthenates of the following properties may be obtained:

Melting point _____ 145° C. to 165° C.
Soap content _____ About 25%.
Ash _____ 6% to 8%.

Such soda asphalts have no value or use and constitute a troublesome by-product, which cannot be readily burned in furnaces because of the slagging of fire bricks by the action of the caustic, nor can they be used for paving and similar purposes because of their tendency to emulsify with water, due to their content of water soluble soaps which act as emulsifying agents.

Our method for treating soda asphalts consists essentially of emulsifying the soda asphalt with water and then treating the emulsion with a solution of an inorganic salt, which causes precipitation of the soaps from the aqueous phase. As the result of the precipitation of the emulsifying agents, the emulsion coagulates. To facilitate emulsification, the soda asphalt may first be melted.

As the soaps are precipitated, they are immediately adsorbed by the emulsified asphalt particles, and upon coagulation of the latter the soaps are finely dispersed throughout the resulting mass. Two phases form, an asphalt phase containing the water-insoluble metal soap, and an aqueous phase containing the soda salt of the acid radical of the salt used for the precipitation.

The deemulsified asphalt is a spongy mass from which water can be separated by kneading, pressing, melting or evaporation. Due to its content of metal naphthenates, it possesses a peculiar adhesive power toward mineral matter and the like, which is considerably greater than that of ordinary asphalts. The colour of the separated asphalt is usually very much lighter than that of the original soda asphalt, particularly if the latter is produced from a distillate by redistillation over caustic soda rather than from a crude oil, and frequently is so light that coloured asphalt can be produced by incorporating therein pigments such as iron oxide, chrome yellow, yellow ocher, red brick powder, etc.

Among the metals which form water-insoluble naphthenates are the alkali earth metals and lead, copper, zinc, cadmium, mercury, iron, nickel, cobalt, etc. In most instances we use solutions of calcium chloride because of its availability and cheapness.

When producing paving materials and the like from soda asphalt, we usually proceed by melting and emulsifying same with a quantity of water about equal or several times the volume of the soda asphalt. The resulting emulsion is mixed with or spread over a filler material or aggregate of the type of sand, gravel, broken rock, brick, slag, cement, clay, fibrous material, saw dust, etc., and the mass so obtained is then treated with a quantity of a solution of calcium chloride or an equivalent salt, sufficient to convert substantially all soda soaps to water-insoluble calcium or other metal soaps. The quantity of salt required obviously depends on the amount and the average molecular weight of the naphthenic acids contained in the emulsion. The asphalt which is thereby precipitated from the emulsion envelops the aggregate and tenaciously adheres thereto. The resulting mixture can now be spread out and rolled to produce a pavement which is well suited for side walks, light traffic roads, tennis courts, etc.

The following is an illustrative example of producing from soda asphalt a paving material of the type described:

A quantity of soda asphalt containing about 30% sodium naphthenate is heated to about 190° C. The resulting liquid is mixed and mechanically agitated with about twice its own volume of hot water of about 95° C. For a short while the emulsion boils violently during which period the soda soaps are extracted from the asphalt by the hot water and are dissolved therein. After the emulsion has come to rest, it is poured over and mixed with gravel contained in a barrel type mixer, in the proportion of about six parts of anhydrous asphalt to one hundred parts of gravel. After the gravel is well coated with the emulsion, a quantity of a 20% solution of calcium chloride amounting to about 30% to 35% by volume of the original soda asphalt, is added and mixing is continued for a while. The resulting mass is now spread and rolled, whereby a smooth and lasting pavement is produced.

The asphaltic products according to the invention may still be improved by incorporating the same with oils of the kind usually employed for diluting or cutting back bituminous materials. This improved embodiment of the invention may, for instance, be carried out as follows:

The aqueous emulsion of soda asphalt, prepared as described above, is treated with the calcium chloride or the like solution until the supernatant water becomes light-coloured. The said water is separated as completely as possible, for example by decantation, the residual mass is washed, if desired, in order to remove therefrom the excess of calcium chloride or the like, and the heating is continued in order to evaporate the remaining water. According to the properties desired in the product to be obtained, the raw material may be incorporated, prior to its conversion or at some stage of the treatment described above, with a suitable quantity of oil, e. g. kerosene or a heavier mineral oil.

In this way valuable substitutes of the ordinary bituminous materials may be obtained, viz. solid binders having a penetration, measured at 25° C. according to the A. S. T. M. method, varying from less than 40 to more than 200, as also viscous oils for use as substitutes of the usual bituminous road oils or cutbacks.

For instance, a product having a penetration of 150, prepared in the manner as described and, if desired, incorporated with a suitable pigment, may be used for coating a fine-graded mineral aggregate, and the mixture may be laid cold by ramming in order to constitute a road covering. The said asphaltic product appears to have substantially the same binding and covering properties as an ordinary bituminous road oil or cutback.

We claim as our invention:

1. In the process of producing asphalt composition from soda asphalt produced as a residue from distilling a mineral oil in the presence of an excess of caustic soda and containing sodium naphthenates, the steps of emulsifying the soda asphalt with water whereby naphthenates are dissolved in the water, and treating the resulting emulsion with an aqueous solution of a salt of an inorganic acid and a metal, the naphthenates of which are insoluble in water, to precipitate metal naphthenates and effect breaking of the emulsion under conditions to produce two separate layers, an aqueous layer containing the sodium salt of said inorganic acid, and an asphalt layer containing the water-insoluble naphthenate salt and separating the layers.

2. The process of claim 1 in which the inorganic salt is calcium chloride.

3. In the process of producing light coloured asphalt composition from soda asphalt produced as a residue from distilling a mineral oil distillate in the presence of an excess of caustic soda, the steps comprising emulsifying a soda asphalt containing over 20% by weight sodium naphthenates with water to dissolve naphthenates in the water, mixing the resulting emulsion with a pigment and treating the resulting mixture with an aqueous solution of a salt of an inorganic acid and a metal, the naphthenates of which are insoluble in water, whereby metal naphthenates are precipitated and the emulsion is broken under conditions to produce two separate layers, an aqueous layer containing the sodium salt of said inorganic acid, and an asphalt layer containing the water-insoluble naphthenate salt and separating the layers.

4. The process of claim 1 in which the inorganic salt is a water-soluble salt of a heavy metal.

SAMUEL KÔN.
MICHEL TOURNADRE.